United States Patent
Jersin et al.

(10) Patent No.: US 10,467,299 B1
(45) Date of Patent: Nov. 5, 2019

(54) IDENTIFYING USER INFORMATION FROM A SET OF PAGES

(71) Applicant: Microsoft Technology Licensing, LLC, Redmond, WA (US)

(72) Inventors: John Robert Jersin, San Francisco, CA (US); Benjamin John McCann, Mountain View, CA (US); Erik Eugene Buchanan, Mountain View, CA (US); Gio Borje, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 202 days.

(21) Appl. No.: 15/341,711

(22) Filed: Nov. 2, 2016

Related U.S. Application Data (60) Provisional application No. 62/382,155, filed on Aug. 31, 2016, provisional application No. 62/378,445, filed on Aug. 23, 2016.

(51) Int. Cl.
*G06F 16/248* (2019.01)
*H04L 29/08* (2006.01)
*G06F 21/60* (2013.01)
*G06F 16/951* (2019.01)
*G06F 16/955* (2019.01)

(52) U.S. Cl.
CPC .......... *G06F 16/951* (2019.01); *G06F 16/248* (2019.01); *G06F 16/9566* (2019.01); *G06F 21/604* (2013.01); *H04L 67/306* (2013.01)

(58) Field of Classification Search
CPC ......... G06F 17/30864; G06F 17/30887; G06F 17/30554; G06F 16/248; G06F 16/9566; G06F 16/951; G06F 21/604; H04L 67/306

USPC ......................................................... 707/734
See application file for complete search history.

(56) References Cited

U.S. PATENT DOCUMENTS

| | | | |
|---|---|---|---|
| 6,009,199 A | 12/1999 | Ho | |
| 6,026,417 A | 2/2000 | Ross et al. | |
| 6,349,299 B1 | 2/2002 | Spencer et al. | |
| 6,408,297 B1 * | 6/2002 | Ohashi ................. | G06F 16/951 707/E17.108 |
| 6,606,620 B1 | 8/2003 | Sundaresan et al. | |

(Continued)

OTHER PUBLICATIONS

"U.S. Appl. No. 15/410,525, Non Final Office Action dated May 3, 2018", 23 pgs.

(Continued)

*Primary Examiner* — Phong H Nguyen
(74) *Attorney, Agent, or Firm* — Schwegman Lundberg & Woessner, P.A.

(57) ABSTRACT

Systems and methods for identifying user information from a set of pages are disclosed. In example embodiments, a server determines that a first set of pages is associated with a specific user based on addresses of the first set of pages having a common portion of a uniform resource locator (URL). The server determines that at least a threshold number of pages from the first set of pages include common information, the common information comprising contact information or social networking information. The server associates the contact information or the social networking information with a user profile of the specific user. The server provides, as a digital transmission, the contact information or the social networking information.

17 Claims, 5 Drawing Sheets

(56) References Cited

U.S. PATENT DOCUMENTS

| | | |
|---|---|---|
| 6,738,767 B1 | 5/2004 | Chung et al. |
| 6,874,002 B1 | 3/2005 | Peleus et al. |
| 7,065,483 B2 | 6/2006 | Decary et al. |
| 7,634,632 B2 | 12/2009 | Suponau et al. |
| 7,836,041 B1 | 11/2010 | Jain et al. |
| 7,912,842 B1 | 3/2011 | Bayliss |
| 7,930,322 B2 | 4/2011 | MacLennan |
| 8,117,024 B2 | 2/2012 | Dane |
| 8,306,942 B2 | 11/2012 | Chen et al. |
| 8,370,349 B2 | 2/2013 | Quoc et al. |
| 8,521,715 B1 | 8/2013 | Fearnow |
| 8,543,904 B1 | 9/2013 | Karls et al. |
| 8,620,836 B2 | 12/2013 | Ghani et al. |
| 8,631,009 B2 | 1/2014 | Lisa et al. |
| 8,818,910 B1 | 8/2014 | Liu et al. |
| 8,825,785 B1 | 9/2014 | Shah et al. |
| 9,201,966 B2 | 12/2015 | Lundberg |
| 9,405,807 B2 | 8/2016 | Obernikhin et al. |
| 9,430,742 B2 | 8/2016 | Zhang et al. |
| 9,582,490 B2 | 2/2017 | Simard et al. |
| 9,940,323 B2 | 4/2018 | Boyer et al. |
| 10,120,937 B2 | 11/2018 | Peng |
| 10,185,738 B1 | 1/2019 | Jersin et al. |
| 2004/0133855 A1 | 7/2004 | Blair et al. |
| 2005/0125402 A1 | 6/2005 | Viola et al. |
| 2005/0132002 A1 | 6/2005 | Creamer et al. |
| 2006/0074999 A1 | 4/2006 | Chidlovskii |
| 2006/0218111 A1 | 9/2006 | Cohen |
| 2007/0027672 A1 | 2/2007 | Decary et al. |
| 2007/0073758 A1 | 3/2007 | Perry et al. |
| 2008/0033996 A1 | 2/2008 | Kesari |
| 2008/0065630 A1 | 3/2008 | Luo et al. |
| 2008/0097781 A1 | 4/2008 | Clarke et al. |
| 2008/0109294 A1 | 5/2008 | Williams et al. |
| 2008/0140684 A1 | 6/2008 | O'reilly et al. |
| 2008/0229244 A1 | 9/2008 | Markus et al. |
| 2009/0228297 A1 | 9/2009 | Mcgovern et al. |
| 2009/0234669 A1 | 9/2009 | Fredericks |
| 2009/0239467 A1 | 9/2009 | Gulin et al. |
| 2009/0287657 A1 | 11/2009 | Bennett |
| 2010/0070448 A1 | 3/2010 | Omoigui |
| 2010/0070499 A1 | 3/2010 | Gottsman |
| 2010/0121631 A1 | 5/2010 | Bonnet et al. |
| 2010/0153289 A1 | 6/2010 | Schneiderman et al. |
| 2010/0161566 A1 | 6/2010 | Adair et al. |
| 2011/0173145 A1 | 7/2011 | Wu et al. |
| 2011/0184939 A1 | 7/2011 | Elliott |
| 2011/0225139 A1 | 9/2011 | Wang et al. |
| 2011/0258193 A1 | 10/2011 | Brdiczka et al. |
| 2012/0030126 A1 | 2/2012 | Mccagg et al. |
| 2012/0041939 A1* | 2/2012 | Amsterdamski .... G06F 16/9535 707/709 |
| 2012/0096041 A1 | 4/2012 | Rao et al. |
| 2012/0117465 A1 | 5/2012 | Carmel et al. |
| 2012/0197835 A1 | 8/2012 | Costa et al. |
| 2012/0246168 A1 | 9/2012 | Srivastava et al. |
| 2012/0290950 A1 | 11/2012 | Rapaport et al. |
| 2012/0330708 A1 | 12/2012 | Khan |
| 2013/0006975 A1 | 1/2013 | Li et al. |
| 2013/0013489 A1 | 1/2013 | Kremen et al. |
| 2013/0018871 A1 | 1/2013 | Mehta et al. |
| 2013/0054598 A1 | 2/2013 | Caceres |
| 2013/0117287 A1 | 5/2013 | Jagota et al. |
| 2013/0166489 A1 | 6/2013 | Jagota |
| 2013/0212185 A1 | 8/2013 | Pasquero et al. |
| 2013/0254213 A1 | 9/2013 | Cheng et al. |
| 2013/0275320 A1 | 10/2013 | Moore et al. |
| 2013/0282814 A1* | 10/2013 | Marcucci ............. H04W 4/21 709/204 |
| 2013/0290208 A1* | 10/2013 | Bonmassar ........ G06Q 10/1053 705/321 |
| 2014/0075299 A1* | 3/2014 | Ain .................... G06F 17/2745 715/255 |
| 2014/0101171 A1 | 4/2014 | Danielyan et al. |
| 2014/0122355 A1 | 5/2014 | Hardtke et al. |
| 2014/0122501 A1* | 5/2014 | Shen ..................... G06Q 10/10 707/748 |
| 2014/0143165 A1 | 5/2014 | Posse et al. |
| 2014/0164352 A1* | 6/2014 | Denninghoff ...... H03H 9/02622 707/711 |
| 2014/0279622 A1 | 9/2014 | Lamoureux et al. |
| 2014/0330734 A1 | 11/2014 | Sung et al. |
| 2014/0331124 A1 | 11/2014 | Downs et al. |
| 2015/0006422 A1 | 1/2015 | Carter et al. |
| 2015/0081578 A1 | 3/2015 | Mclaughlin et al. |
| 2015/0106234 A1* | 4/2015 | Kamdar ............. G06Q 30/0629 705/26.63 |
| 2015/0106690 A1* | 4/2015 | Kamdar ................ G06F 16/972 715/234 |
| 2015/0106725 A1* | 4/2015 | Kamdar ............. H04L 61/3025 715/739 |
| 2015/0113605 A1 | 4/2015 | Henderson et al. |
| 2015/0142896 A1 | 5/2015 | Buchanan |
| 2015/0156190 A1 | 6/2015 | Sanso et al. |
| 2015/0205842 A1* | 7/2015 | Jain ........................ G06Q 10/10 707/732 |
| 2015/0248651 A1 | 9/2015 | Akutagawa et al. |
| 2015/0304437 A1 | 10/2015 | Vaccari et al. |
| 2015/0347534 A1 | 12/2015 | Gross et al. |
| 2016/0055235 A1 | 2/2016 | Zhang et al. |
| 2016/0103837 A1 | 4/2016 | Lee et al. |
| 2016/0132832 A1 | 5/2016 | Pinkovezky et al. |
| 2016/0132833 A1 | 5/2016 | Obeid |
| 2016/0142549 A1 | 5/2016 | Kalmstrom |
| 2016/0314123 A1 | 10/2016 | Ramachandran et al. |
| 2017/0098283 A1* | 4/2017 | Rajan .................... G06F 16/951 |
| 2017/0154314 A1 | 6/2017 | Mones et al. |
| 2017/0270484 A1 | 9/2017 | Cengiz et al. |
| 2017/0300565 A1 | 10/2017 | Calapodescu et al. |

OTHER PUBLICATIONS

"U.S. Appl. No. 15/274,418, Non Final Office Action dated Apr. 19, 2018", 31 pgs.

"Final Office Action Issued in U.S. Appl. No. 15/274,418", dated Feb. 13, 2019, 32 pages.

"Non Final Office Action Issued in U.S. Appl. No. 15/274,464", dated Feb. 25, 2019, 14 Pages.

"Non Final Office Action Issued in U.S. Appl. No. 15/404,888", dated Feb. 26, 2019, 16 Pages.

"Non Final Office Action Issued in U.S. Appl. No. 15/404,914", dated Feb. 25, 2019, 17 Pages.

"Non Final Office Action Issued in U.S. Appl. No. 15/411,816", dated Apr. 15, 2019, 41 Pages.

"Examiner Initiated Interview Summary in U.S. Appl. No. 15/253,588", dated Aug. 3, 2018, 3 Pages.

"Non Final Office Action Issued in U.S. Appl. No. 15/253,588", dated Jul. 18, 2018, 16 Pages.

"Notice of Allowance Issued in U.S. Appl. No. 15/253,588", dated Sep. 28, 2018, 14 Pages.

"Response to Non Final Office Action in U.S. Appl. No. 15/253,588", filed Aug. 7, 2018, 15 Pages.

"Examiner Initiated Interview Summary Issued in U.S. Appl. No. 15/274,418", dated Oct. 18, 2018, 4 pages.

"Response to Non Final Office Action Issued in U.S. Appl. No. 15/274,418", filed Oct. 19, 2018, 14 Pages.

"Examiner Initiated Interview Summary in U.S. Appl. No. 15/410,525", dated Jun. 11, 2018, 3 Page.

"Examiner Initiated Interview Summary Issued in U.S. Appl. No. 15/410,525", dated Dec. 17, 2018, 3 Pages.

"Final Office Action Issued in U.S. Appl. No. 15/410,525", dated Nov. 15, 2018, 30 Pages.

"Response to Final Office Action in U.S. Appl. No. 15/410,525", filed Dec. 12, 2018, 14 Pages.

"Response to Non Final Office Action Issued in U.S. Appl. No. 15/410,525", dated Aug. 1, 2018, 15 Pages.

"Examiner Initiated Interview Summary Issued in U.S. Appl. No. 15/499,554", dated Jan. 29, 2019, 3 Pages.

(56) References Cited

OTHER PUBLICATIONS

"Non-Final Office Action Issued in U.S. Appl. No. 15/499,554", dated Jan. 2, 2019, 18 Pages.
"Notice of Allowance Issued in U.S. Appl. No. 15/499,554", dated Feb. 7, 2019, 9 Pages.
"Response to Non Final Office Action in U.S. Appl. No. 15/499,554", filed Jan. 24, 2019, 16 Pages.
"Non-Final Office Action Issued in U.S. Appl. No. 15/410,525", dated Feb. 7, 2019, 21 Pages.
"Final Office Action Issued in U.S. Appl. No. 15/410,525", dated May 28, 2019, 23 Pages.
"Final Office Action Issued in U.S. Appl. No. 15/404,888", dated Jul. 16, 2019, 13 Pages.
"Final Office Action Issued in U.S. Appl. No. 15/404,914", dated Jul. 16, 2019, 14 Pages.
"Final Office Action Issued in U.S. Appl. No. 15/274,464", dated Sep. 4, 2019, 16 Pages.
"Non-Final Office Action Issued in U.S. Appl. No. 15/404,888", dated Sep. 5, 2019, 14 Pages.
"Non-Final Office Action Issued in U.S. Appl. No. 15/410,525", dated Aug. 8, 2019, 22 Pages.

\* cited by examiner

FIG. 1

| ABC BLOG POST | − ☐ ✕ |

200 —

210 — ABC BLOG
220 — POST TITLE

230 — Lorem Ipsum.    Lorem Ipsum.    Lorem Ipsum.
Lorem Ipsum.    Lorem Ipsum.    Lorem Ipsum.
Lorem Ipsum.    Lorem Ipsum.    Lorem Ipsum.

240 — ExampleSocialNetwork.com/ABC
ExampleProfessionalNetwork.com/ABC1
ABC@example.com
212-555-1234

Lorem
Ipsum
Lorem
Ipsum

IDENTIFYING USER INFORMATION FROM A SET OF PAGES

PRIORITY CLAIM

This application claims priority under 35 U.S.C. § 119 to U.S. Provisional Patent Application Ser. No. 62/378,445, filed Aug. 23, 2016, and titled, "IDENTIFYING USER INFORMATION FROM A SET OF PAGES," which is incorporated herein by reference in its entirety. This application claims priority under 35 U.S.C. § 119 to U.S. Provisional Patent Application Ser. No. 62/382,155, filed Aug. 31, 2016, and titled, "MESSAGING SERVICE INTEGRATION WITH DEDUPLICATOR," which is incorporated herein by reference in its entirety.

RELATED APPLICATIONS

This application is related to U.S. patent application Ser. No. 15/253,588, titled "DEDUPLICATION AND DISAMBIGUATION," and filed on Aug. 31, 2016, which is incorporated herein by reference in its entirety. This application is related to U.S. patent application Ser. No. 15/274,418, titled "MESSAGING SERVICE INTEGRATION WITH DEDUPLICATOR," and filed on Sep. 23, 2016, which is incorporated herein by reference in its entirety. This application is related to U.S. patent application Ser. No. 15/274,464, titled "APPLICANT TRACKING SYSTEM INTEGRATION WITH DEDUPLICATOR," and filed on Sep. 23, 2016, which is incorporated herein by reference in its entirety.

TECHNICAL FIELD

The present disclosure generally relates to machines configured for identifying user information, including computerized variants of such special-purpose machines and improvements to such variants, and to the technologies by which such special-purpose machines become improved compared to other special-purpose machines that provide user information identification technology. In particular, the present disclosure addresses systems and methods for identifying user information from a set of pages.

BACKGROUND

A recruiter may be asked to find a skilled person in a specific field to fill a position at a company, for example, a skilled software engineer to fill a position at a software company. In attempting to fill the position, the recruiter may search through a database of contacts. However, filling that database with contacts through which the recruiter may search is a problem in the art.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Some aspects of the subject technology address the problem in the computer arts of identifying user information to generate a profile data repository. The profile data repository may be used, for example, by a recruiter to select a candidate for employment. According to some implementations, the solution to the problem of identifying user information includes a profile server determining that a first set of pages is associated with a specific user based on the first set of pages having, in their addresses, a common portion of a uniform resource locator (URL). The common portion of the URL may be a domain (e.g., example.com) or a domain and additional text (e.g., example.com/johndoe or johndoe.example.com). The profile server determines that at least a threshold number of pages (e.g., 100 pages, 200 pages, 90% of pages, 99% of pages, and the like) from the first set of pages include common information. The common information includes contact information or social networking information. The profile server may also verify that a second set of pages, the addresses of which lack the common portion of the URL, lacks the common information. The profile server associates the contact information or the social networking information with a user profile of the specific user. The profile server provides the contact information or the social networking information to the profile data repository for storage in the user profile of the specific user.

Some aspects of the subject technology include crawling the web (or another network) for information. Machine(s) implementing the subject technology obey requests from persons or machines not to crawl their data. The machine(s) implementing the subject technology do not crawl (or access using an automated script) pages that include a "do not crawl" tag.

Figure 1:
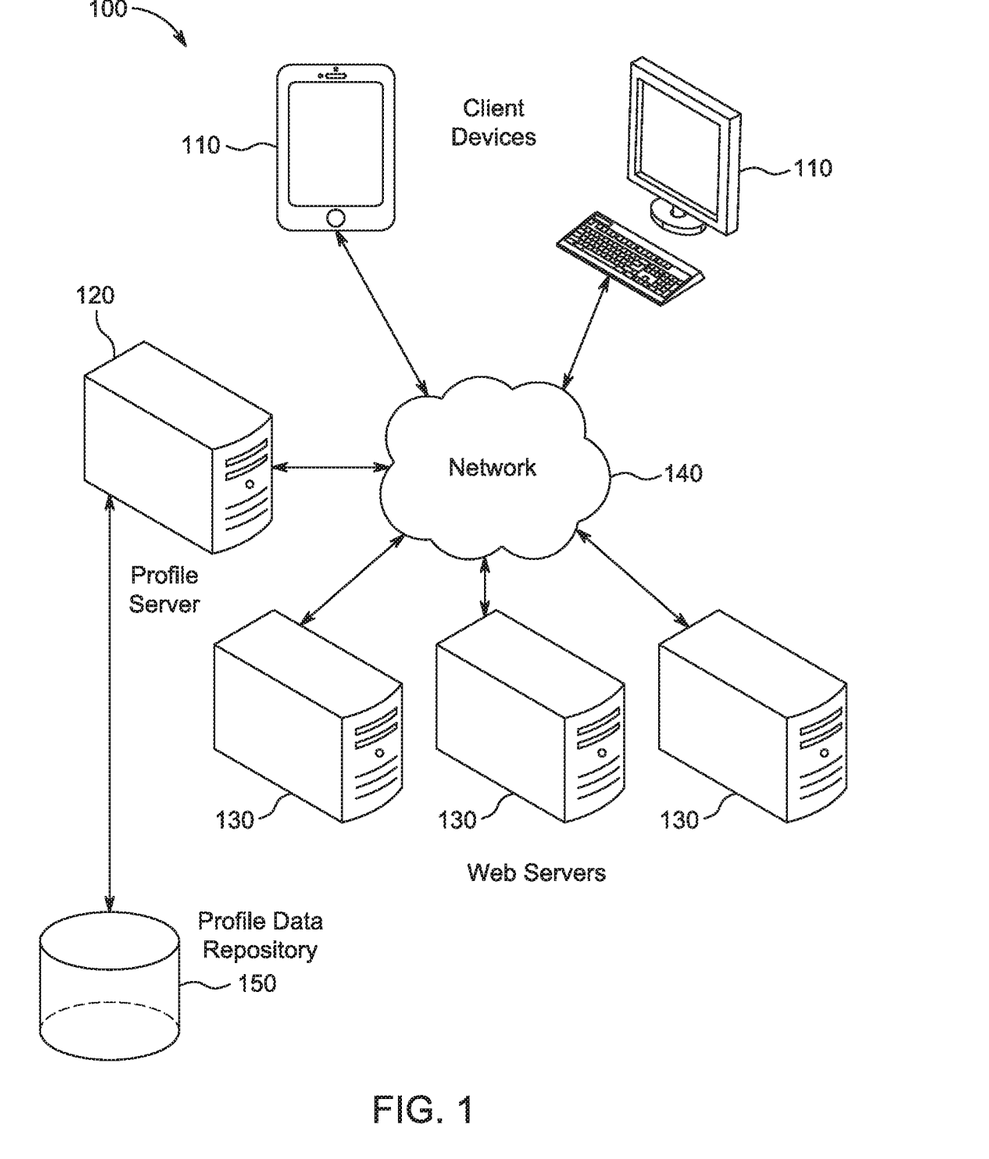
FIG. 1 illustrates an example network system, in accordance with some embodiments.

FIG. 1 illustrates an example network system 100, in accordance with some embodiments. As shown, the system 100 includes client devices 110, a profile server 120, and web servers 130 connected to one another and capable of communicating with one another via a network 140. The network 140 may include one or more networks and may include one or more of the Internet, a wide area network (WAN), a local area network (LAN), a virtual private network (VPN), an intranet, and the like. The profile server 120 is coupled with a profile data repository 150.

The subject technology may be implemented with multiple client devices 110. Each client device 110 may be a laptop computer, a desktop computer, a mobile phone, a tablet computer, a smart watch, a personal digital assistant (PDA), a digital music player, and the like. The client devices 110 may be used to access web-based data, such as pages, at the web servers 130 or to access profile data from the profile data repository 150 via the profile server 120.

The web servers 130 store and provide access to web-based data, such as pages (e.g., webpages). The pages include blog pages, some of which include contact information or social networking information of their authors. The subject technology may be implemented with multiple web servers 130 accessible via the network 140.

As used herein, the phrase "contact information" may include a name, a postal address, a telephone number, an email address, an instant messaging address, a video conferencing address, and the like. As used herein, the phrase "social networking information" may include a handle (e.g., user identifier) or a URL of a profile page in a social or professional network (e.g., Facebook®, Twitter®, LinkedIn®, Google Plus®, and the like).

The profile data repository 150 stores profile data for users. The stored profile data for a given user includes contact information or social networking information for that user. The profile data repository 150 may be implemented as a database or any other data storage unit.

The profile server 120 is operable to store data in the profile data repository 150. In some cases, the profile server 120 is also operable to access data from the profile data repository 150, for example, in response to a request from a client device 110. More detailed examples of the structure and operation of the profile server 120 are provided in conjunction with FIG. 3 and FIG. 4.

Figure 2:
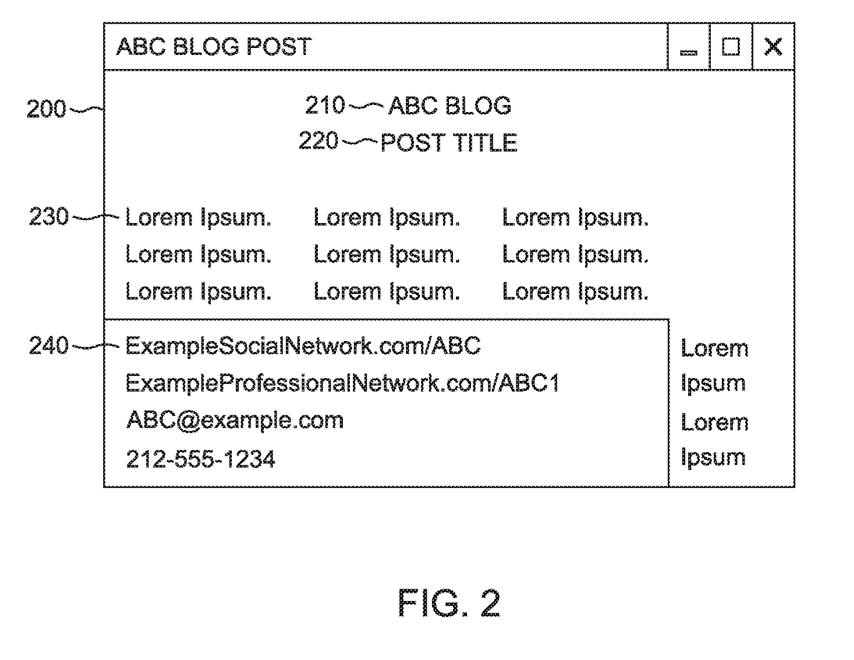
FIG. 2 illustrates an example page with profile information, in accordance with some embodiments.

FIG. 2 illustrates an example page 200 with profile information 240, in accordance with some embodiments. The page 200 may be stored at a web server 130. The web server 130 provides, via the network 140, access to the page 200 so that the page 200 may be displayed at a client device 110 or accessed by the profile server 120 for obtaining profile information, including contact information or social networking information, of the author of the page 200. The page 200 is illustrated in one format in which it could be displayed at the client device 110. However, the page 200 may be stored in a different format and may be displayed in different formats at different client devices.

As shown, the page 200 includes a title associated with a set of pages ("ABC BLOG") 210, a title of the page ("POST TITLE") 220, a page body 230, and profile information 240. The title associated with the set of pages 210 may be associated with multiple different pages. The title associated of the page 220 may be associated with only a single page. The page body 230 may include text (e.g., an article) or images associated with the page. As shown, the profile information 240 includes a social network profile page URL, a professional network profile page URL, an email address, and a telephone number. In some cases, multiple pages within a set of pages may include the same profile information 240. Also, the profile information 240 may be at the same position (e.g., at the bottom left corner, as shown) in multiple pages from the set of pages. In some cases, the profile information 240 may have other text surrounding it, such as "Find me on Facebook®," and "Follow me on Twitter®."

Figure 3:
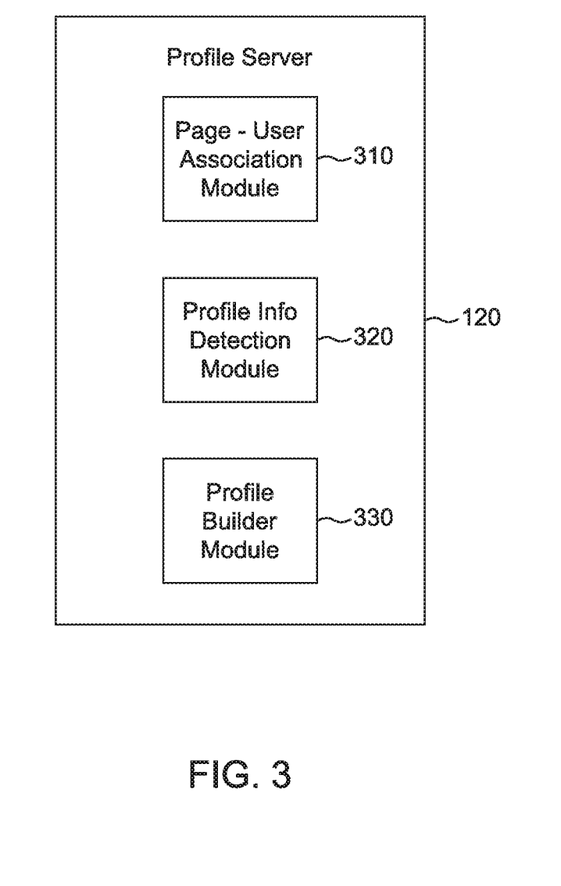
FIG. 3 is a block diagram illustrating an example of the profile server of FIG. 1, in accordance with some embodiments.

FIG. 3 is a block diagram illustrating an example of the profile server 120, in accordance with some embodiments. As shown, the profile server 120 includes a page-user association module 310, a profile info detection module 320, and a profile builder module 330. In some cases, the profile server 120 may have processors(s) and a memory, as described, for example, in conjunction with FIG. 5. Each of the modules 310, 320, and 330 may be a software module including instructions that are stored in memory. When the instructions are implemented by the processor(s), the instructions cause the profile server 120 to carry out operations. Alternatively, the modules may be hard-wired into the processor(s). In some cases, one or more of the modules 310, 320, and 330 may include a combination of software instructions and hard-wired instructions.

The page-user association module 310 is configured (e.g., by software or hard-wiring) to determine that a first set of pages is associated with a specific user based on the first set of pages having addresses that include a common portion of a URL. The profile info detection module 320 is configured to determine that at least a threshold number of pages from the first set of pages include common profile information. The common profile information includes contact information or social networking information and may correspond, for example, to the profile information 240 of FIG. 2. The profile builder module 330 is configured to associate the profile information with a user profile of a specific user and to provide, as a digital transmission, the profile information to the profile data repository 150 for storage at the profile data repository 150. More details of example operations of the profile server 120 are provided in conjunction with FIG. 4.

Figure 4:
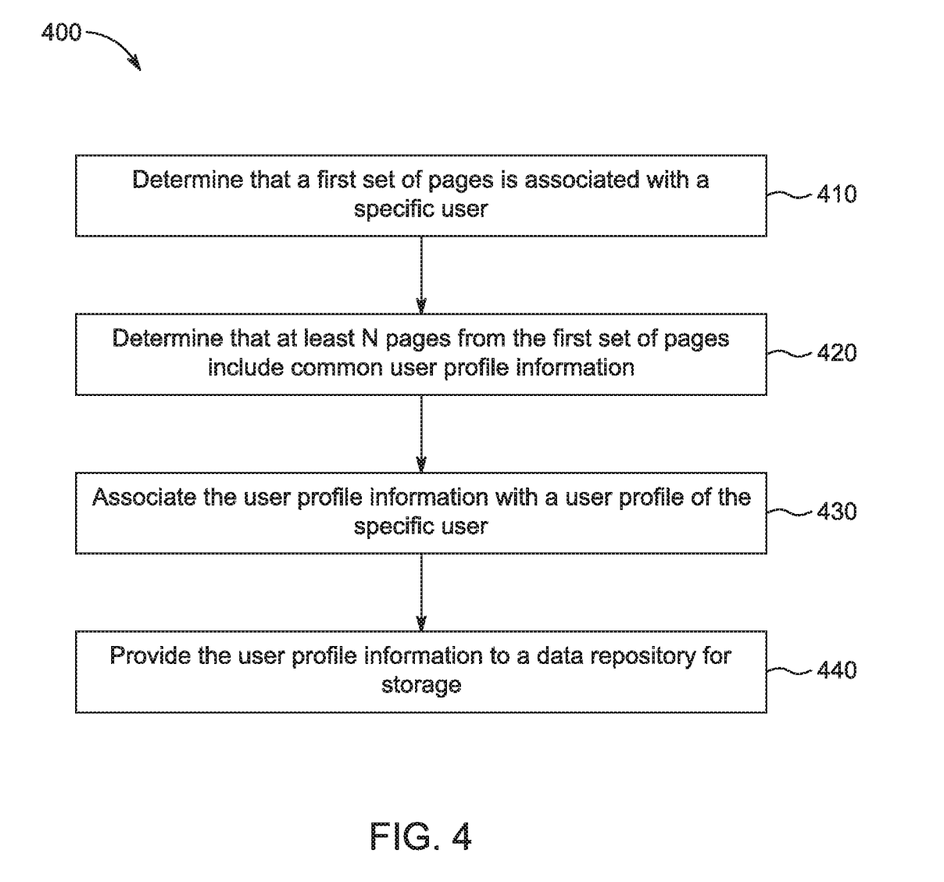
FIG. 4 is a flow chart illustrating an example method for identifying user information from a set of pages, in accordance with some embodiments.

FIG. 4 is a flow chart illustrating an example method 400 for identifying user information from a set of pages, in accordance with some embodiments. In some cases, the method 400 is implemented at the profile server 120.

At operation 410, the profile server 120 determines that a first set of pages (e.g., pages accessed from the web server(s) 130, such as the page 200) is associated with a specific user (e.g., an author of the first set of pages) based on the first set of pages having addresses that include a common portion of a URL. The specific user may not yet be identified (and may be identified later based on information in the first set of pages, as described below). The common portion of the URL may include a common domain (e.g., example.com) or a common domain and additional text (e.g., example.com/ABC or ABC.example.com).

In one embodiment, prior to accessing any page from the first set of pages (or any other pages accessed by the profile server 120), the profile server 120 determines that the profile server 120 is permitted to access the first set of pages. The determinations of operations 410 and 420, and any other determinations described herein, are made in response to the determination that the profile server 120 is permitted to access the first set of pages. If the profile server 120 is not permitted to access any page, the profile server 120 does not access that page.

At operation 420, the profile server 120 determines that at least N pages from the first set of pages include common user profile information. The user profile information may include contact information or social networking information and may correspond to the profile information 240 of FIG. 2. N may correspond to a predetermined number of pages (e.g., 100 pages, 200 pages, and the like), a percentage or proportion of the pages from the first set of pages (e.g., 90%, 99%, and the like), or each and every page from the first set of pages. N may correspond to a threshold number of pages as defined above. In some cases, the common user profile information appears in the same position in each page of the N pages. For example, as shown in FIG. 2, the profile information 240 appears at the bottom left corner of the page 200. Alternatively, the profile information may appear at the bottom right corner, top right corner, top left corner, bottom, top, left side, or right side of the page.

In some cases, the profile server 120 verifies that the common information does not appear in a second set of pages that does not intersect with the first set of pages. The addresses of the second set of pages lack the common portion of the URL. For example, multiple different pages by multiple different authors may include links to the social networking profile of a well-known business (e.g., McDonalds®) or celebrity (e.g., Hillary Clinton). However, only pages authored by a less well-known author might include links to that author's social networking profile. Thus, in pages addressed with the same portion of a URL and which include the same social links (which are not included in other pages), the social links are likely to correspond to the author.

In some cases, the determination that the profile server 120 is permitted to access the first set of pages is based on an absence of a "do not crawl" tag in the first set of pages. In other embodiments, the profile server 120 may forego accessing pages based on other indicators of lack of permission. For example, an owner of webpage(s) may provide, to an employee of a business associated with the profile server 120, a request that the owner's webpages not be accessed by the profile server 120. In response to the request, the employee configures the profile server 120 not to access the owner's webpage(s). In one example, the profile server 120 does not access any page unless affirmative permission is provided for either the profile server 120 or any machine belonging to any entity to access that page.

At operation 430, the profile server 120 associates the user profile information, which may include contact information or social networking information, with a user profile of the specific user. The specific user likely corresponds to the author of the first set of pages. Additional information about the user may be obtained by accessing, using the social networking information, pages within a social networking service associated with the user. These pages may include additional contact information of the user.

At operation 440, the profile server 120 provides, as a digital transmission, the user profile information to a data repository (e.g., profile data repository 150) for storage. The data repository may be any database or other data storage unit. In some cases, the profile server 120 accesses, by using social networking information in the user profile information, one or more public social profiles of the specific user. The profile server 120 adds data from the one or more public social profiles to the user profile of the specific users. For example, the public social profiles may include links to other social profiles or contact information for the specific user. (Some users are more likely to post their contact information in their public social profiles than in their webpages or blogs.)

In this manner, this disclosure provides approaches for identifying user information from a set of pages (e.g., on the world wide web). According to some implementations, a profile server determines that a first set of pages is associated with a specific user based on the first set of pages having, in their addresses, a common portion of a uniform resource locator (URL). The common portion of the URL may be a domain (e.g., example.com) or a domain and additional text (e.g., example.com/johndoe or johndoe.example.com). The profile server determines that at least a threshold number of pages (e.g., 100 pages, 200 pages, 90% of pages, 99% of pages, and the like) from the first set of pages include common information. The common information includes contact information or social networking information. The profile server may also verify that a second set of pages, the addresses of which lack the common portion of the URL, lacks the common information. For example, the second set of pages may include blog posts by users different from the specific user. The profile server associates the contact information or the social networking information with a user profile of the specific user. The profile server provides the contact information or the social networking information to the profile data repository for storage in the user profile of the specific user.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-4 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Example Machine Architecture and Machine-Readable Medium

Figure 5:
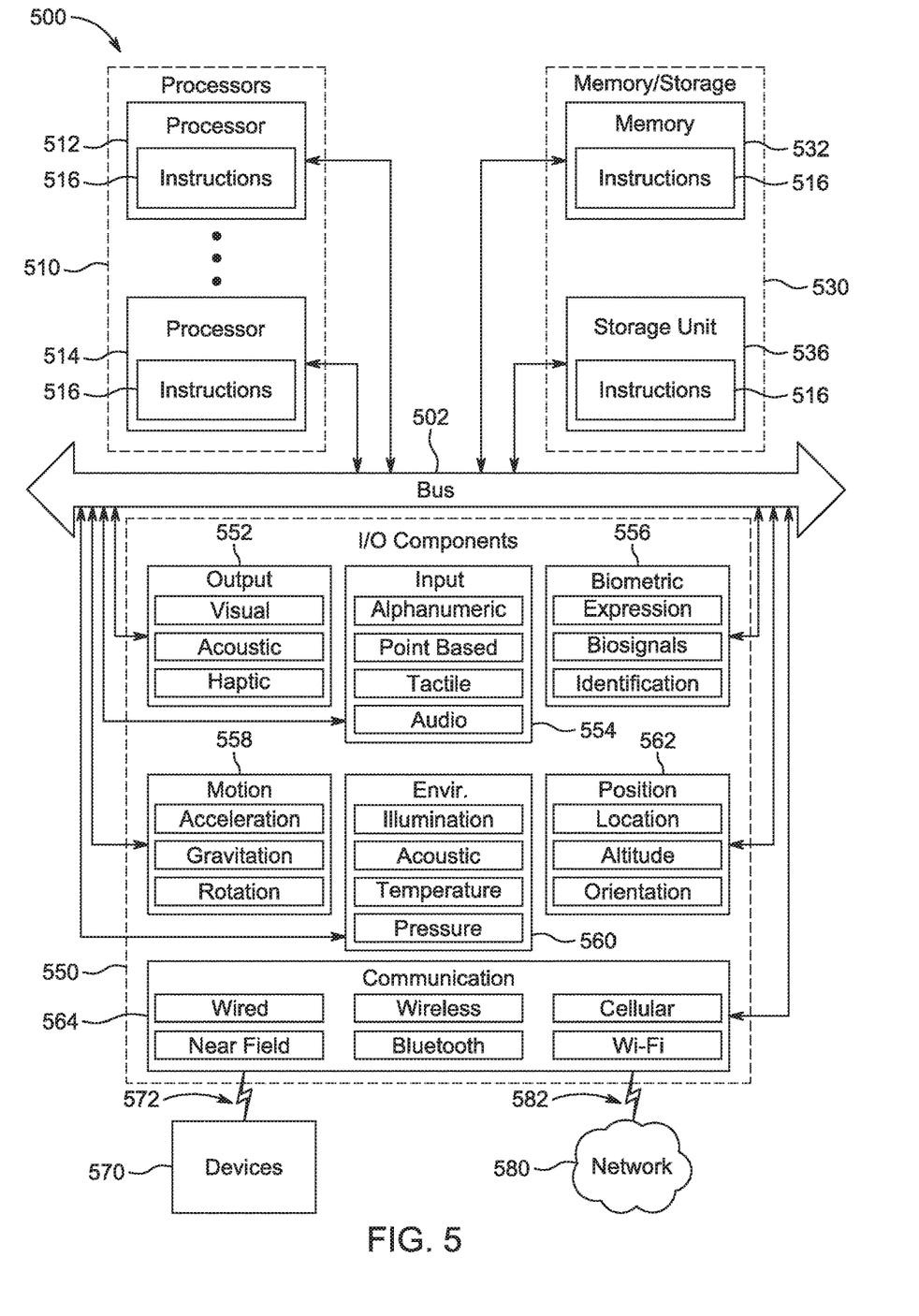
FIG. 5 is a block diagram illustrating components of a machine able to read instructions from a machine-readable medium and perform any of the methodologies discussed herein, in accordance with some embodiments.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. The instructions 516 transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory/storage 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

As used herein, "machine-readable medium" means a device able to store instructions (e.g., instructions 516) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine (e.g., processors 510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or other suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    determining, at a computing machine, that a first set of pages is associated with a specific user based on addresses of the first set of pages having a common portion of a uniform resource locator (URL), the common portion of the URL comprising additional text in the URL that is different from a domain of the URL, wherein the first set of pages is accessed from a web server based computer;
    determining that at least a threshold number of pages from the first set of pages include common information, the common information comprising contact information or social networking information, the common information being present on each and every page from the first set of pages;
    associating the contact information or the social networking information with a user profile of the specific user, wherein the user profile is retrieved from a profile data repository; and
    providing, as a digital transmission, the contact information or the social networking information.

2. The method of claim 1, further comprising:
    determining that the computing machine is permitted to access the first set of pages, wherein a determination that the first set of pages is associated with the specific user and a determination that the at least the threshold number of pages include the common information are made in response to a determination that the computing machine is permitted to access the first set of pages.

3. The method of claim 2, wherein the determination that the computing machine is permitted to access the first set of pages is based on an absence of a "do not crawl" tag at the first set of pages.

4. The method of claim 1, wherein the common information appears at a same position in each page from the at least the threshold number of pages.

5. The method of claim 1, further comprising:
accessing, by using the social networking information, one or more public social profiles of the specific user; and
adding data from the one or more public social profiles to the user profile of the specific user.

6. The method of claim 1, wherein the common information appears in each and every page within the first set of pages.

7. The method of claim 1, further comprising:
verifying that the common information does not appear in a second set of pages, wherein the second set of pages does not intersect with the first set of pages.

8. The method of claim 7, wherein addresses of the second set of pages lack the common portion of the URL.

9. A non-transitory machine-readable medium storing instructions which, when executed by one or more processors of a machine, cause the machine to:
determine that a first set of pages is associated with a specific user based on addresses of the first set of pages having a common portion of a uniform resource locator (URL), the common portion of the URL comprising additional text in the URL that is different from a domain of the URL, wherein the first set of pages is accessed from a web server based computer;
determine that at least a threshold number of pages from the first set of pages include common information, the common information comprising contact information or social networking information, the common information being present on each and every page from the first set of pages;
associate the contact information or the social networking information with a user profile of the specific user, wherein the user profile is retrieved from a profile data repository; and
provide, as a digital transmission, the contact information or the social networking information.

10. The machine-readable medium of claim 9, wherein the common information appears at a same position in each page from the at least the threshold number of pages.

11. The machine-readable medium of claim 9, further storing instructions which, when executed by the one or more processors of the machine, cause the machine to:
access, by using the social networking information, one or more public social profiles of the specific user; and
add data from the one or more public social profiles to the user profile of the specific user.

12. The machine-readable medium of claim 9, wherein the common information appears in each and every page within the first set of pages.

13. The machine-readable medium of claim 9, further storing instructions which, when executed by the one or more processors of the machine, cause the machine to:
verify that the common information does not appear in a second set of pages, wherein the second set of pages does not intersect with the first set of pages.

14. A system comprising:
one or more processors of a machine; and
a memory storing instructions which, when executed by the one or more processors of the machine, cause the machine to:
determine that a first set of pages is associated with a specific user based on addresses of the first set of pages having a common portion of a uniform resource locator (URL), the common portion of the URL comprising additional text in the URL that is different from a domain of the URL, wherein the first set of pages is accessed from a web server based computer;
determine that at least a threshold number of pages from the first set of pages include common information, the common information comprising contact information or social networking information, the common information being present on each and every page from the first set of pages;
associate the contact information or the social networking information with a user profile of the specific user, wherein the user profile is retrieved from a profile data repository; and
provide, as a digital transmission, the contact information or the social networking information.

15. The system of claim 14, the memory further storing instructions which, when executed by the one or more processors of the machine, cause the machine to:
determine that the machine is permitted to access the first set of pages, wherein a determination that the first set of pages is associated with the specific user and a determination that the at least the threshold number of pages include the common information are made in response to a determination that the machine is permitted to access the first set of pages.

16. The system of claim 15, wherein the determination that the machine is permitted to access the first set of pages is based on an absence of a "do not crawl" tag at the first set of pages.

17. The system of claim 14, wherein the common information appears at a same position in each page from the at least the threshold number of pages.

* * * * *